United States Patent Office 3,109,704
Patented Nov. 5, 1963

3,109,704
MANUFACTURE OF ZIRCONIUM OXIDE FROM ZIRCON
John Kenneth Olby, Surbiton, England, assignor to Associated Lead Manufacturers Limited, London, England, a British company
No Drawing. Filed Apr. 24, 1961, Ser. No. 104,830
Claims priority, application Great Britain May 24, 1960
6 Claims. (Cl. 23—18)

This invention provides an improved method for recovering zirconium oxide from its ores.

A known method for recovering zirconium from its ores is described in British specification No. 627,493. According to this method zircon ore is mixed with an amount of sodium or potassium carbonate slightly in excess of the proportion required to form sodium or potassium zirconyl silicate and calcined at a temperature of 950°–1000° C. The reaction proceeds as follows:

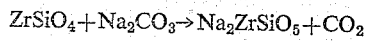
$$ZrSiO_4 + Na_2CO_3 \rightarrow Na_2ZrSiO_5 + CO_2$$

The resulting sinter cake is then caused to react with hydrochloric acid, when the following reaction occurs:

$$Na_2ZrSiO_5 + 4HCl \rightarrow ZrOCl_2 + 2NaCl + SiO_2 + 2H_2O$$

After removal of the precipitated silica the solution of zirconyl chloride is treated with sulphuric acid and heated to precipitate basic zirconium sulphate, which is then decomposed to form zirconium oxide, either by direct heating or by first reacting with alkali and finally heating to dehydrate the hydrated oxide.

When zirconium oxide prepared in this way is utilised for the manufacture of blue ceramic stains by heating together a mixture of zirconium oxide, silica, ammonium metavanadate and sodium fluoride, as described in British specification No. 625,448, the resulting stain has a mauvish tinge and is not of the desired turquoise blue obtained when chemically pure zirconium oxide is used.

My researches have shown that this is due to the fact that the zirconium oxide recovered from the ore by the above method contains a small amount of phosphorus, derived from the zircon ore, in which phosphorus is present as an impurity in a quantity of some 0.05% by weight.

The invention provides a process for manufacturing phosphorus-free zirconium oxide from zircon ore by heating the ore with sodium or potassium carbonate, decomposing the resultant sodium or potassium zirconyl silicate by treatment with hydrochloric acid and subsequently converting the resulting zirconyl chloride into zirconium oxide which is characterized by the fact that phosphorus is removed as a soluble alkali metal phosphate preparatory to the acid decomposition of the sodium zirconyl silicate.

The invention includes phosphorus-free zirconium oxide produced by the above process. A stain of the above composition produced from such zirconium oxide has the desired turquoise blue colour.

The process according to the invention may be carried out by sintering the zircon ore with the stoichiometric quantity or a slight excess of sodium or potassium carbonate, extracting the resulting sodium or potassium zirconyl silicate with a solution of sodium or potassium hydroxide and thereby removing phosphorus as soluble sodium or potassium phosphate, decomposing the silicate by treatment with hydrochloric acid, treating the resulting zirconyl chloride to precipitate basic zirconium sulphate and heating the resulting precipitate.

Alternatively, the ore may be sintered with an excess of sodium or potassium carbonate over the stoichiometric quantity not less than 15% by weight, extracting the resulting sodium or potassium zirconyl silicate with water to remove sodium or potassium phosphate and then proceeding with the acid decomposition of the silicate as before.

The following examples illustrate by way of contrast the effect on the colour of a vanadium-zirconium blue stain of the use of zirconium oxide extracted from zircon ore by the conventional method and of phosphorus-free zirconium oxide produced from zircon ore in accordance with the invention:

(1) *Example of Effect of Phosphorus on a Blue Stain*

An intimate mixture of 434 g. finely ground zircon sand with 276 g. sodium carbonate was calcined for 1 hour at 900–1000° C. The product was pulverised and added to 1260 ml. hydrochloric acid (D 1.16) diluted with 630 ml. water and which had previously been warmed. The mixture was stirred and then digested hot for several hours, washed with hot water and filtered. 1650 ml. of filtrate was obtained containing 100 g./litre of $ZrO_2$. To this was added 43 ml. of sulphuric acid (D 1.84). The solution was boiled with stirring for one hour with continuous addition of water to give a final volume of twice the original volume. The basic zirconium sulphate precipitated was washed by decantation until free from chloride, hydrolysed by the addition of 160 ml. of ammonia (D 0.880) and washed till free of sulphate. The product was calcined for 1 hour at 900° C. A vanadium-zirconium blue stain made from the resulting oxide was mauvish in shade due to the presence of phosphorus in the oxide.

(2) *Example of Phosphorus Removal With Sodium Hydroxide*

5.3 kg. finely ground zircon sand were mixed with 3.35 kg. sodium carbonate. The mixture was calcined for 1 hour at 950°–1000° C. giving 6¼ kg. of sodium zirconyl silicate. This was pulverised and added to a solution of 6¼ kg. caustic soda in 18 litres of water. The slurry was stirred vigorously and heated to 65–70° C. for 10 hours. The solid matter was allowed to settle, the caustic solution was decanted off and the extracted sodium zirconyl silicate was washed by decantation until substantially alkali free. 750 g. of the wet product containing 500 g. $Na_2ZrSiO_5$ was added to 1120 ml. hydrochloric acid (D 1.16) diluted with 310 ml. water. The mixture was stirred, digested hot for 3 hours, washed with hot water and filtered giving 1480 ml. of filtrate containing 113 g./litre $ZrO_2$. 330 ml. were diluted to 370 ml. and 10 ml. sulphuric acid was added (D 1.84). The solution was boiled with constant stirring for 1 hour with continuous addition of water to give a final volume of 740 ml. The precipitated zirconium basic sulphate was washed by decantation until free from chloride, hydrolysed by the addition of 40 ml. of ammonia (D 0.880) and again washed by decantation until free of sulphate. The resulting hydrous zirconia was calcined for 1 hour at 900° C. A vanadium-zirconium blue stain prepared from the resulting oxide had the desired turquoise colour.

(3) *Removal of Phosphorus With Excess Sodium Carbonate*

500 g. finely ground zircon sand was intimately mixed with 362 g. sodium carbonate. The mix was calcined for 2 hours at 950°–1000° C. The product was wet-ground and then digested for several hours with hot water (about 1¼ litres). The supernatant liquor was decanted and the residue digested for several hours with more hot water (about 1 litre). The supernatant liquor was again decanted and the residue was added to 1450 ml. of hydrochloric acid (D 1.16) with stirring. The mixture was digested hot overnight. The product was extracted with hot water and filtered giving 2490 ml. of filtrate containing 70 g./litre of zirconia. Zirconium basic sulphate was precipitated from the liquor and converted to oxide as described in Example 2. A vanadium-zirconium blue stain prepared from the oxide had the desired turquoise colour.

What I claim as my invention and desire to secure by Letters Patent is:

1. A process of manufacturing phosphorus-free zirconium oxide from zircon ore which comprises converting said ore into an alkali metal zirconyl silicate by sintering said ore at a temperature of 900–1000° C. with an alkali metal carbonate selected from the group consisting of sodium carbonate and potassium carbonate and in an amount of at least the stoichiometric quantity, treating said alkali metal zirconyl silicate with an aqueous extraction medium selected from the group consisting of water, an aqueous solution of sodium hydroxide and an aqueous solution of potassium hydroxide to extract phosphorus only therefrom as a soluble alkali metal phosphate selected from the group consisting of sodium phosphate and potassium phosphate, then converting the alkali metal zirconyl silicate into zirconyl chloride by treatment with hydrochloric acid, and converting the zirconyl chloride into zirconia by treatment with sulphuric acid followed by calcination of the resulting precipitate.

2. A process of manufacturing phosphorus-free zirconium oxide from zircon ore which comprises converting said ore into an alkali metal zirconyl silicate by sintering said ore at a temperature of 900–1000° C. with a substantially stiochiometric quantity of an alkali metal carbonate selected from the group consisting of sodium carbonate and potassium carbonate, extracting said alkali metal zirconyl silicate with a solution of an alkali metal hydroxide selected from the group consisting of sodium hydroxide and potassium hydroxide and thereby removing phosphorus only therefrom as a soluble alkali metal phosphate, then converting the alkali metal zirconyl silicate into zirconyl chloride by treatment with hydrochloric acid, and converting the zirconyl chloride into zirconia by treatment with sulphuric acid followed by calcination of the resulting precipitate.

3. A process as claimed in claim 2, in which the alkali metal carbonate is sodium carbonate.

4. A process as claimed in claim 2, in which the alkali metal hydroxide is sodium hydroxide.

5. A process of manufacturing phosphorus-free zirconium oxide from zircon ore which comprises converting said ore into an alkali metal zirconyl silicate by sintering said ore at a temperature of 900–1000° C. with a quantity of an alkali metal carbonate selected from the group consisting of sodium carbonate and potassium carbonate in an amount at least 15% by weight in excess of the stoichiometric quantity, extracting said alkali metal zirconyl silicate with water to remove phosphorus only therefrom as a soluble alkali metal phosphate selected from the group consisting of sodium phosphate and potassium phosphate, then converting the alkali metal zirconyl silicate into zirconyl chloride by treatment with hydrochloric acid, and converting the zirconyl chloride into zirconia by treatment with sulphuric acid followed by calcination of the resulting precipitate.

6. A process as claimed in claim 5, in which the alkali metal carbonate is sodium carbonate.

References Cited in the file of this patent

UNITED STATES PATENTS

| | | |
|---|---|---|
| 1,261,948 | Loveman | Apr. 9, 1918 |
| 1,454,564 | Ruff | May 8, 1923 |
| 2,696,425 | Kistler | Dec. 7, 1954 |
| 2,981,594 | Burkin | Apr. 25, 1961 |

FOREIGN PATENTS

| | | |
|---|---|---|
| 488,464 | Canada | Dec. 2, 1952 |
| 627,493 | Great Britain | Aug. 10, 1949 |
| 625,448 | Great Britain | June 28, 1949 |

OTHER REFERENCES

Beyer et al.: U.S. Atomic Energy Commission Report, ISC-437 (rev.), Aug. 17, 1954, 15 pages (pages 12–14 of particular interest).